(12) United States Patent
Griffin et al.

(10) Patent No.: US 9,740,378 B2
(45) Date of Patent: Aug. 22, 2017

(54) COLLABORATION CONTENT SHARING

(71) Applicant: Cisco Technology, Inc., San Jose, CA (US)

(72) Inventors: Keith Griffin, Oranmore (IE); Andrew Henderson, Spiddal (IE)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 14/720,850

(22) Filed: May 25, 2015

(65) Prior Publication Data

US 2016/0349965 A1 Dec. 1, 2016

(51) Int. Cl.
| | |
|---|---|
| G06F 3/00 | (2006.01) |
| G06F 3/0484 | (2013.01) |
| G06F 3/0481 | (2013.01) |
| G06Q 10/10 | (2012.01) |
| H04M 7/00 | (2006.01) |

(52) U.S. Cl.
CPC ........ *G06F 3/04842* (2013.01); *G06F 3/0481* (2013.01); *G06Q 10/10* (2013.01); *H04M 7/0027* (2013.01)

(58) Field of Classification Search
CPC ............................ G06F 3/04842; G06F 3/0481
See application file for complete search history.

(56) References Cited

U.S. PATENT DOCUMENTS

| | | | |
|---|---|---|---|
| 8,135,128 B2 | 3/2012 | Marti et al. | |
| 8,458,597 B1* | 6/2013 | Tijssen | H04N 21/4788 |
| | | | 715/748 |
| 8,473,850 B2 | 6/2013 | Liang et al. | |
| 8,849,879 B2 | 9/2014 | John et al. | |
| 8,947,493 B2* | 2/2015 | Lian | H04N 7/15 |
| | | | 348/14.08 |
| 9,197,733 B2* | 11/2015 | Gardenfors | H04M 1/7253 |
| 9,307,006 B2* | 4/2016 | Micucci | H04L 67/02 |
| 9,513,793 B2* | 12/2016 | Johansson | G06F 3/1454 |
| 2005/0120306 A1* | 6/2005 | Klassen | G06F 3/0482 |
| | | | 715/765 |
| 2008/0307324 A1* | 12/2008 | Westen | G06F 3/0486 |
| | | | 715/753 |
| 2011/0145698 A1* | 6/2011 | Penov | G06F 17/272 |
| | | | 715/235 |
| 2013/0047123 A1 | 2/2013 | May et al. | |

(Continued)

OTHER PUBLICATIONS

Net Power & Light Spin—What's new in Spin 1.6. (2014) available on the web at: http://getspin.com/spin/.

(Continued)

*Primary Examiner* — Omar Abdul-Ali

(74) *Attorney, Agent, or Firm* — Samuel M. Katz

(57) ABSTRACT

In one embodiment, a device including a communication interface to receive a notification during a collaboration event that there is at least one content item that has been offered for sharing during the collaboration event and a processor to generate a user interface screen for output, to a display device, during the collaboration event, the user interface screen including a pictorial representation of the notification of the at least one content item that has been offered for sharing and at least one participant representation. Related apparatus and methods are also described.

18 Claims, 6 Drawing Sheets

(56) References Cited

U.S. PATENT DOCUMENTS

2015/0106714 A1* 4/2015 Jeong .................. G06F 3/04812
715/716
2016/0308940 A1* 10/2016 Procopio ........... G06F 17/30144

OTHER PUBLICATIONS

Annoying Pop-up Adverts and Bubble Ads, The Weekly Gripe, (2007) available on the web at: http://weeklygripe.co.uk/annoying-pop-up-adverts-and-bubble-ads/.

Superuser.com. How can I transfer multiple files at once over Bluetooth? (2013) available on the web at: http://superuser.com/questions/584120/how-can-i-transfer-multiple-files-at-once-over-bluetooth.

Wilhelm, Alex; Dropbox updates desktop client with improved file sharing, real-time notifications for incoming folders; (Mar. 12, 2013) available on the web at: http://thenextweb.com/apps/2013/3/12/dropbox-refreshes-its-desktop-client-for-improved-file-sharing-real-time-notifications/.

\* cited by examiner

COLLABORATION CONTENT SHARING

TECHNICAL FIELD

The present disclosure generally relates to sharing content in a collaboration system.

BACKGROUND

In existing meeting systems, such as Cisco WebEx (Reg. Trademark), the sharing of content between participants is typically controlled by a host controlled meeting share. For example in Webex, a 'ball' metaphor is used to pass control to allow other users to share content during the meeting. Other systems use different techniques and some systems allow for another user to request to be able to share.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention a device including a communication interface to receive a notification during a collaboration event that there is at least one content item that has been offered for sharing during the collaboration event, and a processor to generate a user interface screen for output, to a display device, during the collaboration event, the user interface screen including a pictorial representation of the notification of the at least one content item that has been offered for sharing and at least one participant representation.

There is also provided in accordance with another embodiment of the present invention a client device including a processor to join a video collaboration event, a video collection interface to receive a plurality of images from a video camera, the processor being operative to generate a video from the received plurality of images, and a communication interface to send the generated video to a collaboration server, receive video from the collaboration server, and receive a notification from the collaboration server during the video collaboration event that there is at least one content item that has been offered for sharing during the video collaboration event, wherein the processor is operative to generate a user interface screen for output, to a display device, during the video collaboration event, the user interface screen including a pictorial representation of the notification of the at least one content item that has been offered for sharing, at least one participant representation and at least part of the video received from the collaboration server.

DESCRIPTION CONTINUED

Figure 1:
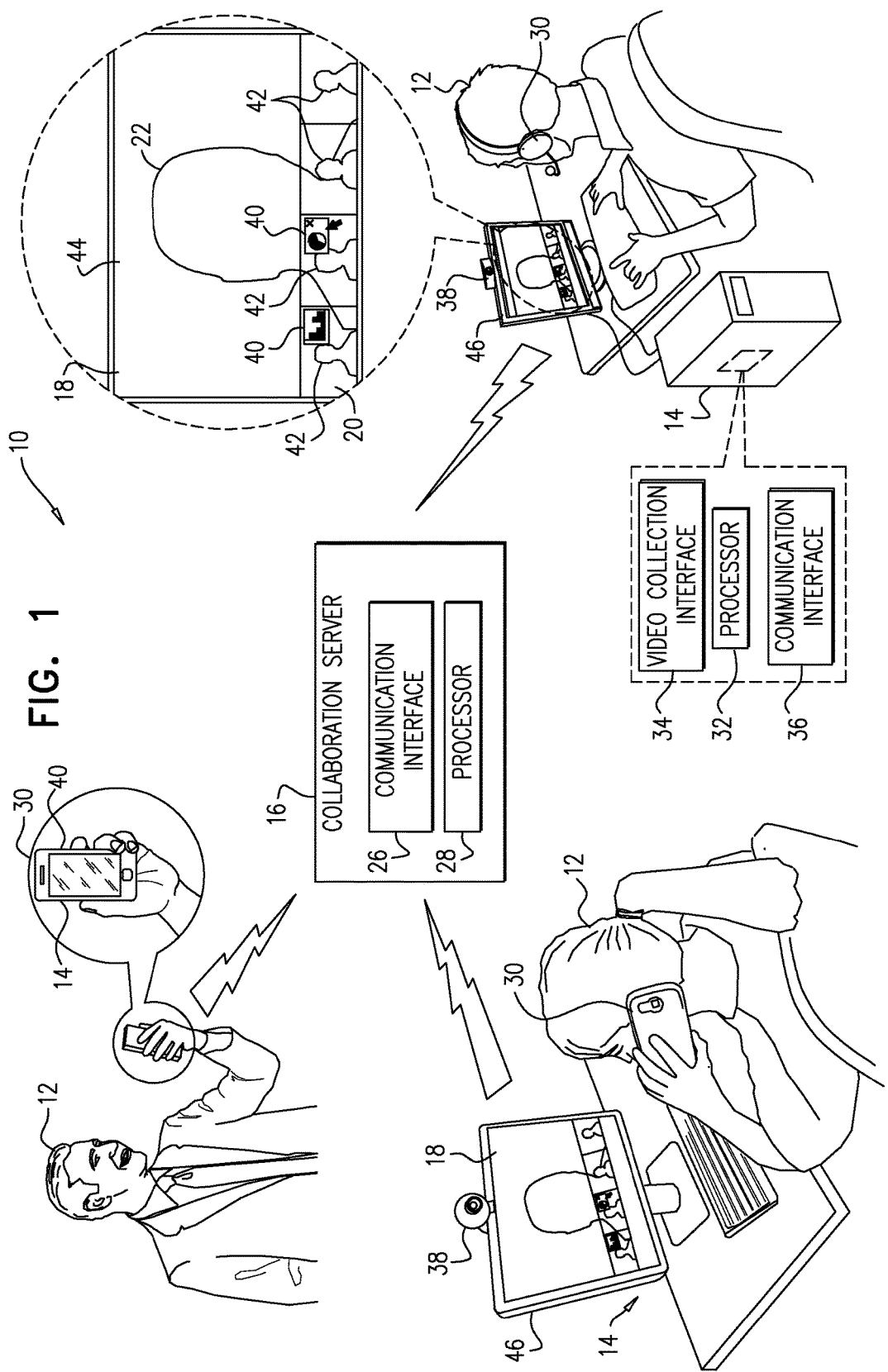
FIG. 1 is a partly pictorial, partly block diagram view of a collaboration system constructed and operative in accordance with an embodiment of the present invention.

Reference is now made to FIG. 1, which is a partly pictorial, partly block diagram view of a collaboration system 10 constructed and operative in accordance with an embodiment of the present invention.

By way of introduction, frequently during a meeting (video collaboration event) participants 12 may have related content that can add to the current topic, e.g.: a document, image, slide or video that they think may illustrate a point or move the meeting along more efficiently. The collaboration system 10 enables one or more of the participants 12 to propose a content item or items for sharing with one or more of the other participants 12 in the video collaboration event.

The collaboration system 10 typically provides hosting of the video collaboration event between a plurality of client devices 14 (for example, but not limited to, a mobile telephone, smart phone, tablet device or personal computer) of the participants 12 via a collaboration server 16 (also known as a multimedia share server). It should be noted that collaboration system 10 may be implemented directly between the client devices 14 without the collaboration server 16 where the functionality of the collaboration server 16 is implemented in one or more of the client devices 14. The collaboration server 16 may communicate with the client devices 14 via any suitable network, wired or wireless, or any suitable combination thereof. The collaboration server 16 may be implemented in any suitable location, for example, but not limited to, in a client site or in the cloud.

Each of the client devices 14 typically includes a processor 32, a video collection interface 34 and a communication interface 36.

The processor 32 of each client device 14 is operative to join a video collaboration event. The video collection interface 34 is operative to receive a plurality of images from a video camera 38. The processor 32 is operative to generate a video from the received images. The communication interface 36 is operative to send the generated video and event data to the collaboration server 16 and receive video and event data from the collaboration server 16. Event data may include data about meeting attendees (roster), meeting details (timing, joining information. Collaboration modalities available in the video collaboration event are typically voice, video and share (of content).

The collaboration server 16 typically includes a communication interface 26 and a processor 28.

The communication interface 26 of the collaboration server 16 is operative to receive the video and the event data as part of the video collaboration event from the client devices 14. The processor 28 of the collaboration server 16 may prepare a user interface screen 18 from the multiple video feeds and the event data received from the client devices 14. The user interface screen 18 is then received and decoded and output for display by one or more of the client devices 14. It should be noted that different user interface screens 18 may be prepared for different client devices 14. For example, each client device 14 in the video collaboration event may receive a screen showing representations 42 of all the other participants 12 along the bottom row 20 of the screen 18 and the current speaker 22 in the middle of the screen 18. Additionally, or alternatively, the communication interface 26 of the collaboration server 16 may forward the multiple video feeds and data to the client devices 14 so that the client devices 14 may prepare a user interface screen from the multiple video feeds and data.

The processor 28 of the collaboration server 16 may also process audio received from the various participants 12 either via the client device 14 of each participant 12 or via a telecommunication device 30 (for example, but not limited to, a mobile phone, smart phone or non-mobile telephone) of the relevant participant(s).

Additionally, the collaboration system 10 allows multiple participants 12 to propose content for sharing with a meeting host and/or other participant(s) 12. The content may be previewed and if the content appears to be of interest then the participant proposing the content can be invited to share the content or alternatively the host or another participant may share the content for all the participants 12 to see. The collaboration system 10 allows the participants 12 (who are not the host or the current presenter) to actively contribute and propose related content during a meeting. The collaboration system 10 allows the participants to avoid actions like sending an instant message (IM) or chat message to the host in order to request to share content.

In more detail, the processor 32 of the client device 14 is operative such that if a participant 12 wants to share an item of content with one or more of the other participants 12, a dialog box (not shown) for selecting the item of content is displayed via selecting a button (not shown) on the user interface screen 18 or via a shortcut or other suitable mechanism. The item of content is selected from the dialog box. Alternatively, the processor 32 of the client device 14 is operative such that the content item may be selected from a file manager and the file is selected by right clicking on the file and selecting "share item in collaboration event", by way of example only.

The participant proposing the content item is also able to choose the participant(s) with which to share the content item.

The processor 32 of the client device 14 is operative to send a notification that there is a content item for sharing with at least one other participant 12 to the collaboration server 16. A pictorial representation 40 of the notification of the content item may also be sent along with the notification of the content item from the client device 14 to the collaboration server 16.

The proposed content is indicated via the representation 40 in the user interface screen 18 prepared by the collaboration server 16 or by the client device 14. It should be noted that the representation 40 may be generated by the collaboration server 16 or the client device 40 when preparing the user interface screen 18 as appropriate (depending on whether the collaboration server 16 or the client device 14 is preparing the user interface screen 18).

The user interface screen 18 typically includes the pictorial representation 40 of the notification of the content item(s) that has been offered for sharing, at least one participant representation 42 and at least part of the video 44 received by the collaboration server 16 or the client device 14 as appropriate (depending on whether the collaboration server 16 or the client device 14 is preparing the user interface screen 18).

The pictorial representation 40 of the proposed content may include a thumbnail of the content or a thumbnail of the first page of the content or a first frame of video (if the content is a video item) or a logo showing that content is being proposed. The representation 40 of the content may be displayed along-side (or above or below, etc.) the representation 42 of the participant proposing sharing the content.

The participant representation 42 may be a video feed from the client device 14 showing a video of the participant, or a photo of the participant, or an avatar or a name of the participant.

If the user interface screen 18 is prepared by the collaboration server 16, the communication interface 26 of the collaboration server 16 is operative to receive the notification from one of the client devices 14 during the video collaboration event that there is at least one content item that has been offered for sharing during the video collaboration event. The processor 28 of the collaboration server 16 is operative to generate the user interface screen 18 for output, to a display device 46 of the client devices 14, during the video collaboration event.

If the user interface screen 18 is prepared by the client device 14 which displays the user interface screen 18, the communication interface 36 of that client device 14 is operative to receive the notification from the collaboration server 16 (or directly from a collaboration client device 14, typically when the collaboration server 16 is not part of the collaboration system 10) during the video collaboration event that there is at least one content item that has been offered for sharing during the video collaboration event. The processor 32 of that client device 14 is operative to generate the user interface screen 18 for output, to the display device 46 of that client device 14, during the video collaboration event.

A participant 12 may select the content for previewing and/or sharing with other participants 12 by an appropriate selection action, for example, but not limited to, a single or double mouse click on the representation 40, or right clicking the mouse on the representation 40 and then selecting "preview" or "share", as appropriate, from a displayed menu.

If the proposed content is in the form of a presentation or video, the content suggested could be clicked through or scrubbed by the participant 12 to quickly ascertain the value of the proposed content.

When the content is initially proposed for sharing, a sample of the content (for example, a first page or a first frame) may be sent to the other participant(s) for preview with the notification of the sharing. Alternatively, when the content is proposed for sharing, the whole content item may be sent to the other participants 12 for preview and/or sharing.

When the user interface screen 18 is prepared by the collaboration server 16, a client device 14 may operate a remote user interface. Selection(s) made by the participant 12 based on the user interface screen 18, for example, but not limited to, selecting a content item for preview and/or sharing, are sent back to the collaboration server 16 from that client device 14 for processing and generating a new user interface screen 18 as necessary.

Figure 2:
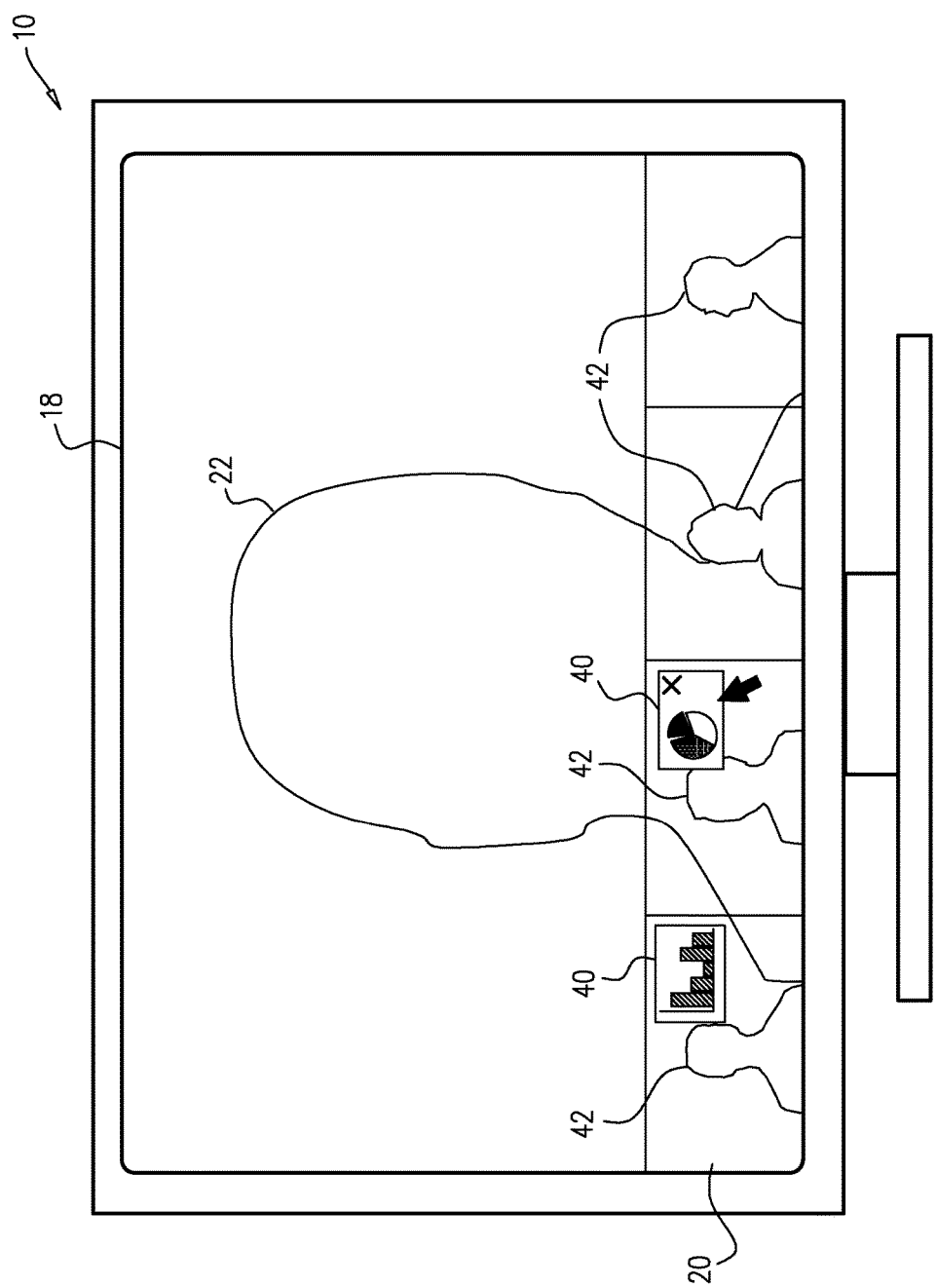
FIG. 2 is a view of a collaboration user interface screen showing two participants offering content for sharing during a video collaboration event in the system of FIG. 1.

Reference is now made to FIG. 2, which is a view of the collaboration user interface screen 18 showing two participants (represented by participant representations 42) offering content for sharing (represented by the representation 40) during a video collaboration event in the system 10 of FIG. 1.

In FIG. 2, the presenter/speaker 22 is shown speaking in the main view and while doing so two meeting participants (represented by participant representations 42) may feel that they have some content that can contribute to the current topic. Rather than interjecting to ask for control or contacting the host by IM, they simply make their content available for sharing via the collaboration server 16. The host may then make a judgment call and can decide which content to bring into the collaboration event.

The other participants' content is offered for sharing in a subtle way by using a portion of the active presence strip 20 which includes the participant representations 42 and the representations 40 of the content being proposed by the participants thereby keeping the notification of content subtle and identifying the participant(s) wishing to share content.

Figure 3:
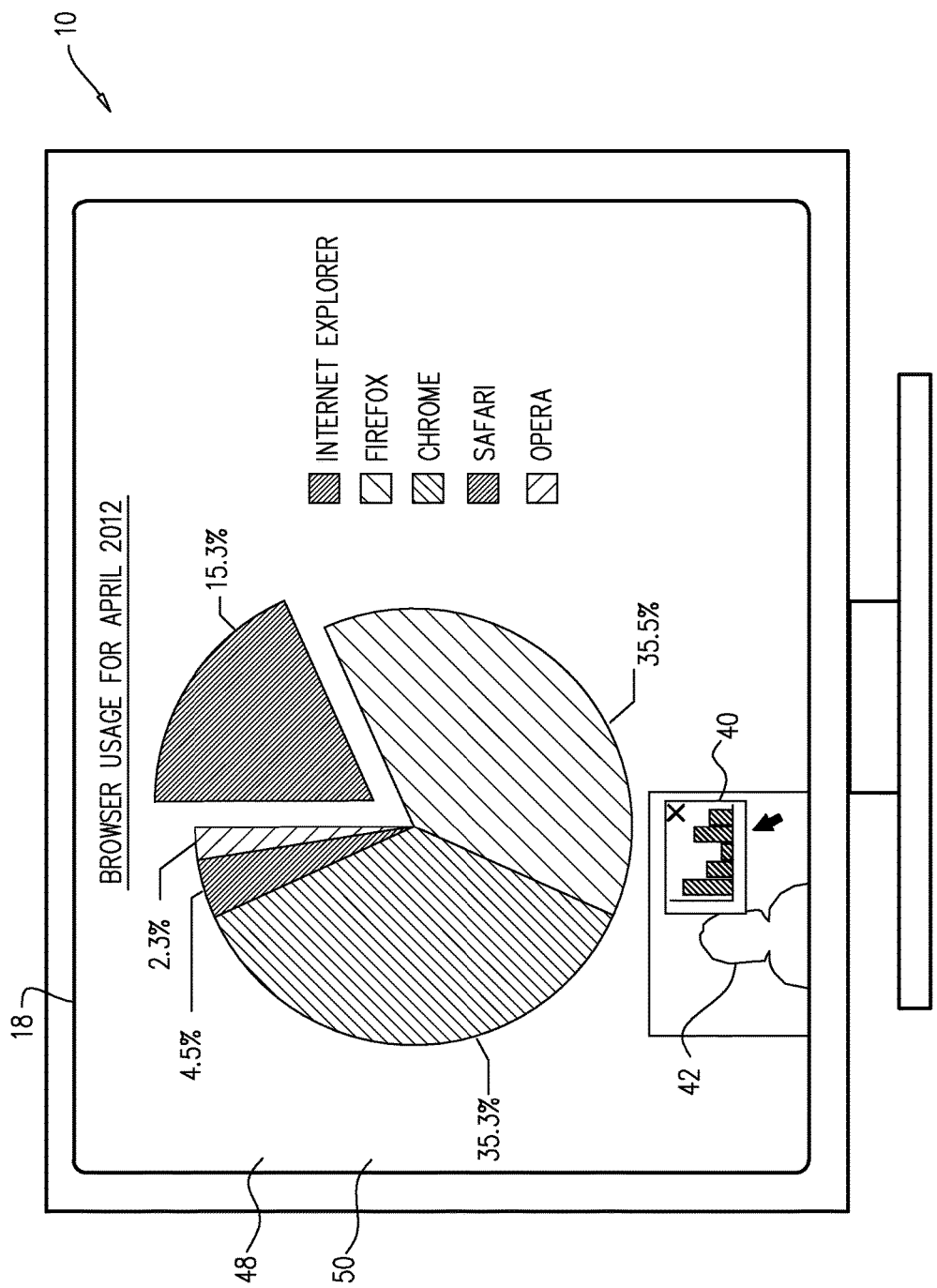
FIG. 3 is a view of a collaboration user interface screen showing a participant offering content for sharing during a video collaboration event while another participant is presenting another content item in the system of FIG. 1.

Reference is now made to FIG. 3, which is a view of the collaboration user interface screen 18 showing a participant offering content for sharing during a video collaboration event while another participant is presenting another content item 48 in the system 10 of FIG. 1.

If the host is sharing his/her desktop 50 including the content item 48 as shown in FIG. 3, other participants can still propose alternate content to the host and to all or some of the other participants. Any content suggested by a participant will be seen on top of, or superimposed over, the host's desktop shown in the user interface screen 18 as the representation 40 (e.g.: thumbnail) of the content being proposed next to the participant representation 42 (e.g.: the video stream of the participant proposing the content) of the participant proposing the content. The host, or if applicable another participant, may choose to preview the proposed content and the host may choose to offer the share to the other participant or dismiss the content. For non-moderated meetings, any participant that is sharing may receive suggested content prompts and allow someone else to share or select the content for sharing themselves.

Figure 4:
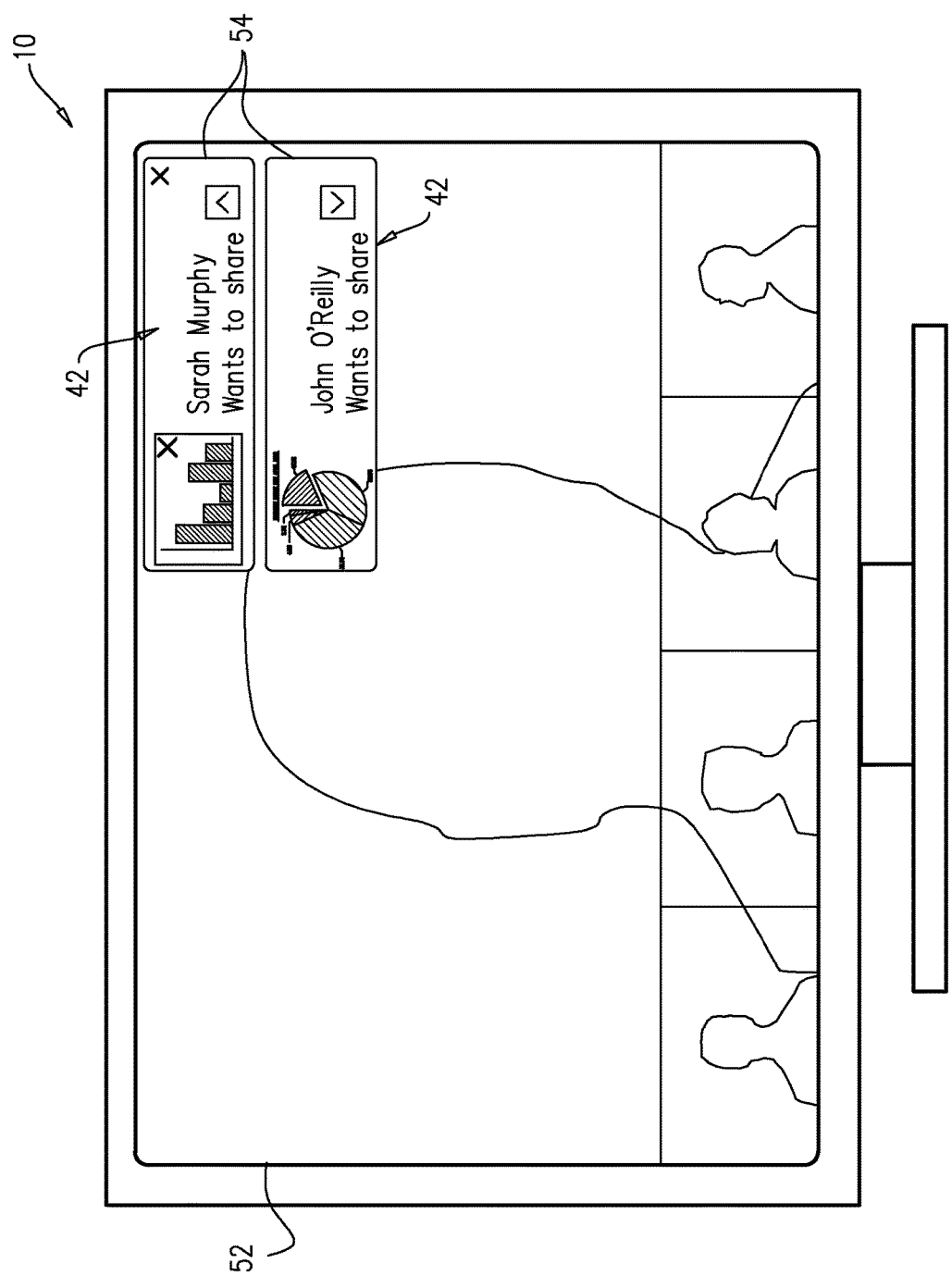
FIG. 4 is a view of a first alternative collaboration user interface screen showing two participants offering content for sharing during a video collaboration event in the system of FIG. 1.

Reference is now made to FIG. 4, which is a view of a first alternative collaboration user interface screen 52 showing two participants offering content for sharing during a video collaboration event in the system 10 of FIG. 1.

FIG. 4 shows incoming stacked notifications 54 to the meeting host for content related to the current topic. The participant representation 42 in this example is simply the name of the person proposing the share. The oldest content proposal is shown at the top, by way of example only.

Figure 5:
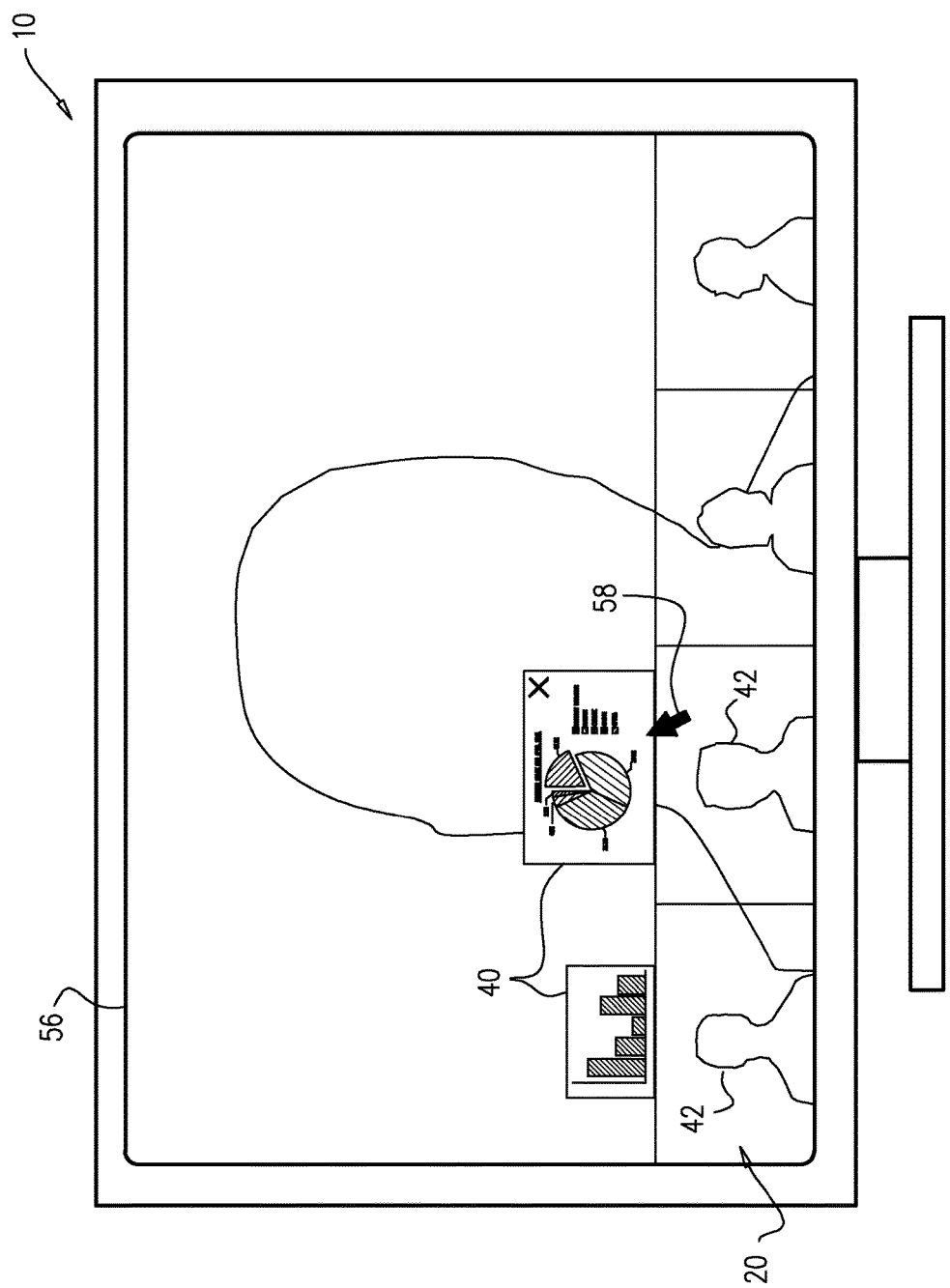
FIG. 5 is a view of a second alternative collaboration user interface screen showing two participants offering content for sharing during a video collaboration event in the system of FIG. 1.

Reference is now made to FIG. 5, which is a view of a second alternative collaboration user interface screen 56 showing two participants offering content for sharing during a video collaboration event in the system 10 of FIG. 1.

In some smaller form factor devices the use of a portion of the active presence strip 20 may be too small to allow the host or another participant to make a judgment call on the proposed content. In this case, or when desired for any reason, the representation 40 of the content to be shared may be disposed above the active presence strip 20 appropriately placed above the participant representation 42 of the participant proposing the content for sharing.

FIG. 5 also shows that the representation 40 which is being hovered over by a cursor 58 is enlarged for better previewing of the proposed content item so that the representation 40 is a selectable thumbnail preview of at least a portion of the content item being proposed for sharing.

It will be appreciated that if the active presence strip 20 is arranged vertically on one side of the user interface screen 56 then the representation 40 may be disposed to the side of the associated participant representation 42 by way of example only.

It will be appreciated that if the active presence strip 20 is arranged along the top row of the user interface screen 56 then the representation 40 may be disposed below the associated participant representation 42 by way of example only.

Optionally content may be withdrawn by participants in the video collaboration event, for example, if the topic changed or the previously proposed content becomes less relevant or irrelevant.

Optionally, as content sharing proposals are submitted, the proposed content (e.g.: a first page of a presentation or a first frame of a video) could be displayed full screen for a few seconds at various configurable degrees of opaqueness.

If multiple items of content have been proposed by the same participant, the proposed items of content may be presented in the user interface screen 18 using a scrolling panel at the side or the representations 40 of the different proposed content items may be stacked with overlap between the representations 40.

Figure 6:
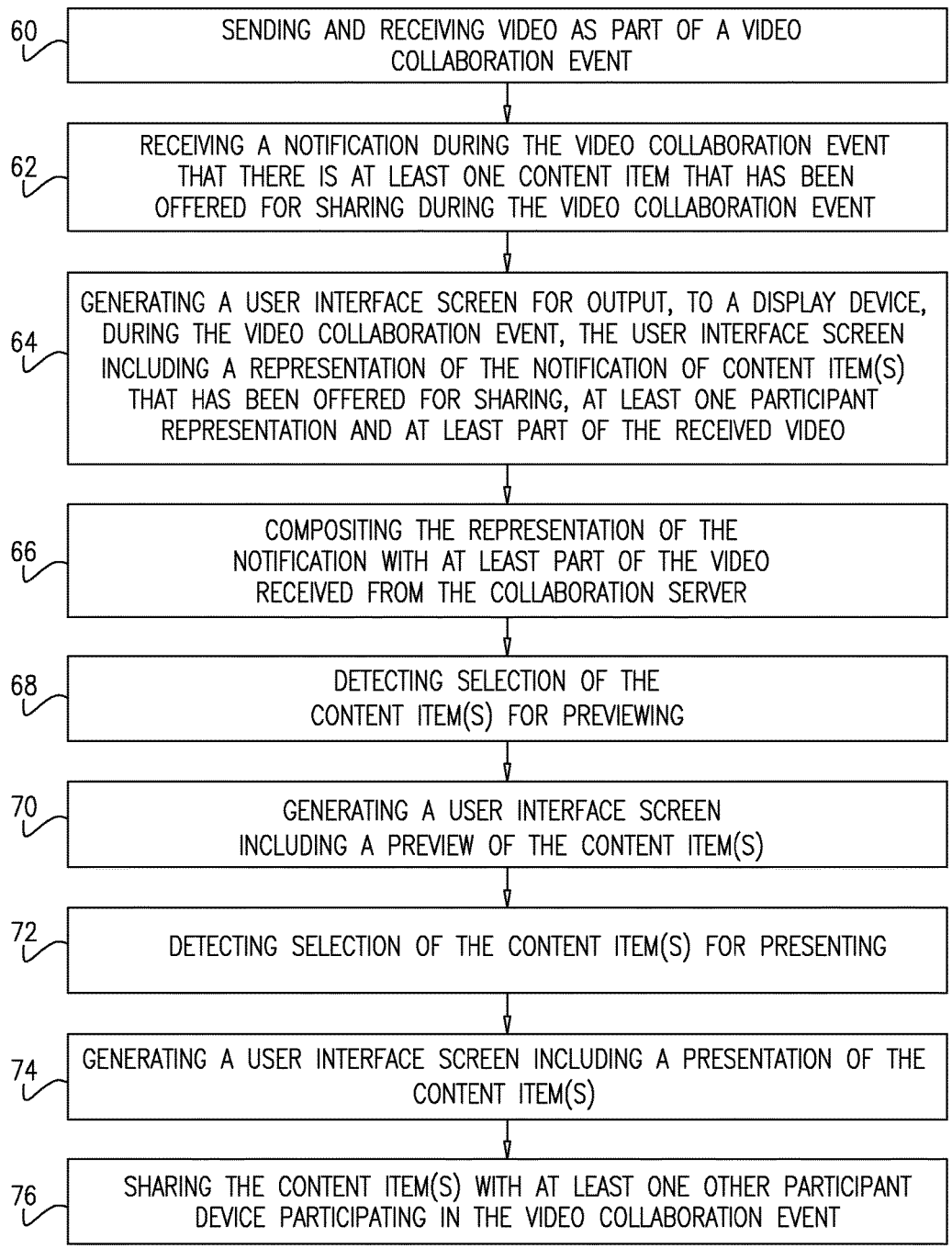
FIG. 6 is a flow chart of an exemplary method of operation of the system of FIG. 1.

Reference is now made to FIG. 6, which is a flow chart of an exemplary method of operation of the system 10 of FIG. 1.

The communication interfaces 26, 36 of the collaboration server 16 and the client devices 14, respectively, are operative to send and receive video as part of a video collaboration event (block 60).

In the description below, the processors 28, 32 and the communication interfaces 26, 36 of the collaboration server 16 and the client devices 14, respectively, are both referenced, as the user interface screen 18 may be generated in the collaboration server 16 or in the client devices 14 (either the client device 14 proposing the content share or the client devices 14 receiving the notification of the content share). Even when the collaboration server 16 or the client device 14 proposing the content share composites the various video streams and data to generate the user interface screen(s) 18, the receiving client devices 14 still need to generate the user interface screen(s) 18 by decoding the video stream generated by the collaboration server 16.

The communication interface 26, 36 is operative to receive a notification during the video collaboration event that there is at least one content item that has been offered for sharing during the video collaboration event (block 62).

The processor 28, 32 is operative to generate a user interface screen for output, to a display device, during the video collaboration event. The user interface screen includes a representation of the notification of the content item(s) that has been offered for sharing, at least one participant representation and at least part of the received video (block 64). Each participant representation may include a participant video/photo/avatar and/or a participant name.

The user interface screen (including the representation of the notification of the content item) may also include another content item currently being presented in the video collaboration event and/or a video of the person currently speaking or presenting.

In the user interface screen, the representation of the notification of the content item(s) may be disposed (above, below, along side or in a list) with a participant representation of a participant who offered sharing the content item(s) with another participant(s) in the video collaboration event.

The representation of the notification of the content item may include a selectable thumbnail preview of at least a portion of the content item(s).

As part of the generation of the user interface screen described above with reference to block 64, the processor 28, 32 is operative to composite the representation of the notification with the video (or part thereof) received from the collaboration server 16 or from one of the collaboration client devices 14 (block 66).

If the user interface screen is generated in the collaboration server 16 or in one of the collaboration client devices 14, the representation of the notification is comprised in data or the video received by the client devices 14 from the collaboration server 16 or the collaboration client device 14 generating the user interface screen.

The content item(s) is selectable for previewing via the representation of the notification, and the processor 28, 32 is operative to detect selection of the content item(s) for previewing (block 68) and generate a user interface screen including a preview of the content item(s) (block 70).

The content item(s) is selectable for presenting via the representation of the notification; and the processor 28, 32 is operative to: detect selection of the content item(s) for presenting (block 72); generate a user interface screen including a presentation of the at least one content item (block 74); and share the content item(s) with at least one other participant device participating in the video collaboration event (block 76).

The steps of the above two paragraphs may be performed in the collaboration server 16 with the client device 14 operating a remote user interface as described above. Alternatively, the steps of the above two paragraphs may be performed in the client devices 14.

The collaboration system 10 has been described above with reference to a video collaboration event including videos of the participants 12 and content being shared via a video stream. However, it will be appreciated that the collaboration system 10 may implement a media collaboration event which may not include videos of the participants 12. Similarly, it will be appreciated that in any of the implementations of the collaboration system 10, the content being shared may be shared by any suitable mechanism, for example, but not limited to, by vide stream or by file download or transfer.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A device comprising:
   a communication interface to receive a notification during a video collaboration event that there is at least one content item that has been offered for sharing by a first participant device to a second participant device during the video collaboration event; and
   a processor to generate a user interface screen for output, to a display device, during the video collaboration event, the user interface screen including a pictorial representation of the notification of the at least one content item that has been offered for sharing and at least one participant representation, the at least one content item being selectable for presenting by a user of the second participant device via the pictorial representation of the notification of the at least one content item that has been offered for sharing, wherein the processor is operative to:
      detect selection for presenting by the user of the second participant device of the at least one content item which was offered for sharing;
      generate a user interface screen including a presentation of the at least one content item which was offered for sharing; and
      share the at least one content item, which was offered for sharing, with at least one other participant device participating in the video collaboration event.

2. The device according to claim 1, wherein the pictorial representation of the notification is comprised in data received from a collaboration server or collaboration client.

3. The device according to claim 1, wherein the processor is operative to composite the pictorial representation of the notification with at least part of video received from a collaboration server or collaboration client in generation of the user interface screen.

4. The device according to claim 1, wherein the at least one participant representation includes a participant video.

5. The device according to claim 1, wherein the at least one participant representation includes a participant name.

6. The device according to claim 1, wherein, in the user interface screen, the pictorial representation of the notification of the at least one content item is disposed with a participant representation of a participant who offered sharing the at least one content item with another participant in the video collaboration event.

7. The device according to claim 1, wherein: the at least one content item is selectable for previewing via the pictorial representation of the notification; and the processor is operative to detect selection of the at least one content item for previewing and generate a second user interface screen including a preview of the at least one content item.

8. The device according to claim 1, wherein the user interface screen including the pictorial representation of the notification of the at least one content item also includes another content item currently being presented in the video collaboration event.

9. The device according to claim 1, wherein the pictorial representation of the notification of the at least one content item includes a selectable thumbnail preview of at least a portion of the at least one content item.

10. A first client device comprising:
a processor to join a video collaboration event;
a video collection interface to receive a plurality of images from a video camera, the processor being operative to generate a video from the received plurality of images; and
a communication interface to:
send the generated video to a collaboration server;
receive video from the collaboration server; and
receive a notification from the collaboration server during the video collaboration event that there is at least one content item that has been offered for sharing by a second client device during the video collaboration event, wherein the processor is operative to generate a user interface screen for output, to a display device, during the video collaboration event, the user interface screen including a pictorial representation of the notification of the at least one content item that has been offered for sharing, at least one participant representation and at least part of the video received from the collaboration server, the at least one content item being selectable for presenting by a user of the first client device via the pictorial representation of the notification of the at least one content item that has been offered for sharing, wherein the processor is operative to:
detect selection for presenting by the user of the first client device of the at least one content item which was offered for sharing;
generate a user interface screen including a presentation of the at least one content item which was offered for sharing; and
share the at least one content item, which was offered for sharing, with at least one other client device participating in the video collaboration event.

11. A method comprising:
receiving a notification during a video collaboration event that there is at least one content item that has been offered for sharing during the video collaboration event; and
generating a user interface screen for output, to a display device, during the video collaboration event, the user interface screen including a pictorial representation of the notification of the at least one content item that has been offered for sharing by a first participant device to a second participant device and at least one participant representation, the at least one content item being selectable for presenting by a user of the second participant device via the pictorial representation of the notification of the at least one content item that has been offered for sharing;
detecting selection for presenting by the user of the second participant device of the at least one content item which was offered for sharing;
generating a user interface screen including a presentation of the at least one content item which was offered for sharing; and
sharing the at least one content item, which was offered for sharing, with at least one other participant device participating in the video collaboration event.

12. The method according to claim 11, wherein the pictorial representation of the notification is comprised in data received from a collaboration server or a collaboration client.

13. The method according to claim 11, wherein the generating the user interface screen includes compositing the pictorial representation of the notification with at least part of video received from a collaboration server or collaboration client.

14. The device according to claim 11, wherein the at least one participant representation includes a participant video.

15. The device according to claim 11, wherein the at least one participant representation includes a participant name.

16. The method according to claim 11, wherein, in the user interface screen, the pictorial representation of the notification of the at least one content item is disposed with a participant representation of a participant who offered sharing the at least one content item with another participant in the video collaboration event.

17. The method according to claim 11, wherein: the at least one content item is selectable for previewing via the pictorial representation of the notification; and the method further comprising detecting selection of the at least one content item for previewing and generating a second user interface screen including a preview of the at least one content item.

18. The method according to claim 1, wherein the pictorial representation of the notification of the at least one content item includes a selectable thumbnail preview of at least a portion of the at least one content item.

* * * * *

UNITED STATES PATENT AND TRADEMARK OFFICE
CERTIFICATE OF CORRECTION

Page 1 of 1

PATENT NO. : 9,740,378 B2
APPLICATION NO. : 14/720850
DATED : August 22, 2017
INVENTOR(S) : Keith Griffin et al.

It is certified that error appears in the above-identified patent and that said Letters Patent is hereby corrected as shown below:

In the Claims

Column 10, Line 42 approx., Claim 18, "1," to read as --11,--.

Signed and Sealed this
Third Day of October, 2017

Joseph Matal
*Performing the Functions and Duties of the*
*Under Secretary of Commerce for Intellectual Property and*
*Director of the United States Patent and Trademark Office*